(12) United States Patent
Lee et al.

(10) Patent No.: US 11,666,195 B2
(45) Date of Patent: Jun. 6, 2023

(54) ROBOT AND CONTROL METHOD THEREOF

(71) Applicant: SAMSUNG ELECTRONICS CO., LTD., Suwon-si (KR)

(72) Inventors: Junghwan Lee, Suwon-si (KR);
Daehun Kim, Suwon-si (KR);
Saeyoung Kim, Suwon-si (KR);
Soonhyuk Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 17/177,742

(22) Filed: Feb. 17, 2021

(65) Prior Publication Data

US 2021/0251454 A1    Aug. 19, 2021

Related U.S. Application Data

(60) Provisional application No. 62/977,429, filed on Feb. 17, 2020.

(30) Foreign Application Priority Data

Jul. 29, 2020   (KR) .......................... 10-2020-0094736

(51) Int. Cl.
*A47L 11/40*         (2006.01)
*B25J 9/16*          (2006.01)
(Continued)

(52) U.S. Cl.
CPC ........... *A47L 11/4011* (2013.01); *B25J 9/163* (2013.01); *B25J 9/1653* (2013.01); *B25J 9/1664* (2013.01);
(Continued)

(58) Field of Classification Search
CPC ........ A47L 11/4011; G05D 2201/0203; G05D 2201/02; G05D 2201/0215
See application file for complete search history.

(56) References Cited

U.S. PATENT DOCUMENTS 8,867,790 B2   10/2014   Nanri et al.
9,402,518 B2   8/2016    Burlutskiy
(Continued)

FOREIGN PATENT DOCUMENTS

JP    5698815 B2    4/2015
JP    5870273 B2    2/2016
(Continued)

*Primary Examiner* — Jeff A Burke
*Assistant Examiner* — Christopher A Buksa
(74) *Attorney, Agent, or Firm* — Sughrue Mion, PLLC

(57) ABSTRACT

A method of controlling a robot includes obtaining a first image and a second image of a plurality of objects, the first and second image being captured from different positions; obtaining, from the first and second images, a plurality of candidate positions corresponding to each of the plurality of objects, based on a capturing position of each of the first and second images and a direction to each of the plurality of objects from each capturing position; obtaining distance information between each capturing position and each of the plurality of objects in the first and second images by analyzing the first and second images; and identifying a position of each of the plurality of objects from among the plurality of candidate positions based on the distance information.

18 Claims, 12 Drawing Sheets

(51) Int. Cl.
   *B25J 13/08*      (2006.01)
   *B25J 11/00*      (2006.01)

(52) U.S. Cl.
   CPC ......... *B25J 9/1697* (2013.01); *B25J 11/0085* (2013.01); *B25J 13/089* (2013.01); *A47L 2201/04* (2013.01)

(56) References Cited

U.S. PATENT DOCUMENTS

| | | | |
|---|---|---|---|
| 11,241,791 B1* | 2/2022 | Ebrahimi Afrouzi ... | G06T 7/262 |
| 2018/0296049 A1 | 10/2018 | Izawa et al. | |
| 2018/0338661 A1 | 11/2018 | Shin et al. | |
| 2019/0213438 A1* | 7/2019 | Jones ................... | G06V 30/194 |

FOREIGN PATENT DOCUMENTS

| | | |
|---|---|---|
| JP | 2019-121364 A | 7/2019 |
| KR | 10-1938668 B1 | 1/2019 |
| KR | 10-2001422 B1 | 7/2019 |

\* cited by examiner

ROBOT AND CONTROL METHOD THEREOF

CROSS-REFERENCE TO RELATED APPLICATION(S)

This application is based on and claims priority under 35 U.S.C. § 119 to Korean Patent Application No. 10-2020-0094736, filed on Jul. 29, 2020, in the Korean Intellectual Property Office, and U.S. Provisional Application No. 62/977,429, filed on Feb. 17, 2020, in the United States Patent and Trademark Office, the disclosures of which are incorporated by reference herein in their entireties.

BACKGROUND

1. Field

The disclosure relates to a robot and a method for controlling thereof and, more particularly, to a robot that identifies positions of a plurality of objects by imaging the objects as the robot is travelling and a controlling method thereof.

2. Description of Related Art

In a related art, there are various methods for generating a map corresponding to an environment in which a robot operates. For example, a robot can generate a map corresponding to an environment in which a robot operates by using a simultaneous localization and mapping (SLAM) method using a light detection and ranging (LiDAR) sensor and a vision SLAM method using a camera.

However, in the related-art, the map corresponding to the environment in which the robot operates is not intuitive, and a position of an object such as a home appliance and furniture, or the like, located in the environment is not recognizable, and there may be a problem in that a user of the robot may have a difficulty in grasping a structure of the environment with only a related-art map.

SUMMARY

Provided are a robot capable of determining a position of an object using a plurality of images which capture a plurality of objects at different positions and a method for controlling thereof.

In accordance with an aspect of the disclosure, there is provided a method of controlling a robot, the method including obtaining a first image and a second image of a plurality of objects, the first image and the second image being captured from different positions; obtaining, from the first and second images, a plurality of candidate positions corresponding to each of the plurality of objects, based on a capturing position of each of the first and second images and a direction to each of the plurality of objects from each capturing position; obtaining distance information between each capturing position and each of the plurality of objects in the first and second images by analyzing the first and second images; and identifying a position of each of the plurality of objects from among the plurality of candidate positions based on the distance information.

The method may further include obtaining a third image which captures the plurality of objects at a position different from the capturing positions of the first image and the second image; determining the position of each of the plurality of objects based on the first image and the third image; determining the position of each of the plurality of objects based on the second image and the third image; and determining a final position of each of the plurality of objects based on all the determined positions.

The method may further include obtaining at least one additional image of the plurality of objects; determining a position of each of the plurality of objects based on a plurality of combinations of two images among the first image, the second image, and at least one of the additional images; and determining a final position of the plurality of objects by statistically clustering the positions determined by each combination.

The obtaining the plurality of candidate positions corresponding to each of the plurality of objects may include identifying a plurality of object recognition regions in each of the first and second images by applying the first and second images to an artificial intelligence model; based on a position of the object recognition regions in each of the first and second images, identifying the direction to each of the plurality of objects; and on a map corresponding to an environment in which the robot operates, identifying a coordinate in which a direction to an object from the capturing position of the first image and a direction to the object from the capturing position of the second image intersect as a candidate position among the plurality of candidate positions.

The obtaining the distance information may include obtaining pixel information corresponding to a bottom portion of the object recognition regions in each of the first and second images; and obtaining, based on the obtained pixel information, distance information between the capturing positions of, and the plurality of objects in, the first and second images.

Identifying the position of an object may include excluding a candidate position of the object, among the plurality of candidate positions of the object, of which a distance between the candidate position and a coordinate corresponding to a capturing position of the candidate position is greater than or equal to a preset range from distance information between the position of the object and the capturing position of the candidate position.

Obtaining the plurality of candidate positions may include obtaining a map corresponding to an environment in which the robot operates; matching the plurality of candidate positions with corresponding locations on the map; and obtaining the plurality of candidate positions by excluding a candidate position, among the plurality of candidate positions, which is beyond a preset range from a capture location on the map.

The method may further include identifying information about a position of each of the plurality of objects on the map by matching the position of the plurality of objects with corresponding locations on the map; identifying size information of the plurality of objects using the pixel information; and displaying the plurality of objects using positon information and size information of the plurality of identified object recognition regions.

The method may further providing information about the plurality of objects on the map, wherein the information about the plurality of objects is obtained through the first and second images.

In accordance with an aspect of the disclosure, there is provided a robot including a memory configured to store at least one instruction; a camera configured to capture an image of a plurality of objects; and a processor connected to the memory and the camera, the processor being configured to control the robot. The processor, by executing the at least one instruction, may obtain a first image and a second image of a plurality of objects, the first image and the second image being captured from different positions, obtain, from the first and second images, a plurality of candidate positions corresponding to each of the plurality of objects, based on a capturing position of each of the first and second images and a direction to each of the plurality of objects from each capturing position, obtain distance information between each capturing position and each of the plurality of objects in the first and second images by analyzing the first and second images, and identify a position of each of the plurality of objects from among the plurality of candidate positions based on the distance information.

The processor may be further configured to obtain a third image which captures the plurality of objects at a position different from the capturing positions of the first image and the second image; determine the position of each of the plurality of objects based on the first image and the third image; determine the position of each of the plurality of objects based on the second image and the third image; and determine a final position of each of the plurality of objects based on all the determined positions.

The processor may be further configured to obtain at least one additional image of the plurality of objects, through the camera, determine a position of each of the plurality of objects based on a plurality of combinations of two images among the first image, the second image, and at least one of the additional images; and determine a final position of the plurality of objects by statistically clustering the positions determined by each combination.

The processor may be further configured to identify a plurality of object recognition regions in each of the first and second images by applying the first and second images to an artificial intelligence model, based on a position of the object recognition regions in each of the first and second images, identify the direction to each of the plurality of objects, and on a map corresponding to an environment in which the robot operates, identify a coordinate in which a direction to an object from the a capturing position of the first image and a direction to the object from the a capturing position of the second image intersect as a candidate position among the plurality of candidate positions.

The processor may be further configured to obtain pixel information corresponding to a bottom portion of the object recognition regions in each of the first and second images and obtain, based on the obtained pixel information, distance information between the capturing positions of, and the plurality of objects in, the first and second images.

The processor may be further configured to obtain a position an object by excluding a candidate position of the object, among the plurality of candidate positions of the object, of which a distance between the candidate position and a coordinate corresponding to a capturing position of the candidate position is greater than or equal to a preset range from distance information between the position of the object and the capturing position of the candidate position.

The processor may be further configured to obtain a map corresponding to an environment in which the robot operates, match the plurality of candidate positions with corresponding locations on the map, and obtain the plurality of candidate positions by excluding a candidate position, among the plurality of candidate positions, which is beyond a preset range from a capture location on the map.

The processor may be further configured to identify information about a position of each of the plurality of objects on the map by matching the position of the plurality of objects with corresponding locations on the map, identify size information of the plurality of objects using the pixel information, and display the plurality of objects using positon information and size information of the plurality of identified object recognition regions.

The processor may be further configured to provide information about the plurality of objects on the map. The information about the plurality of objects may be obtained through the first and second images.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
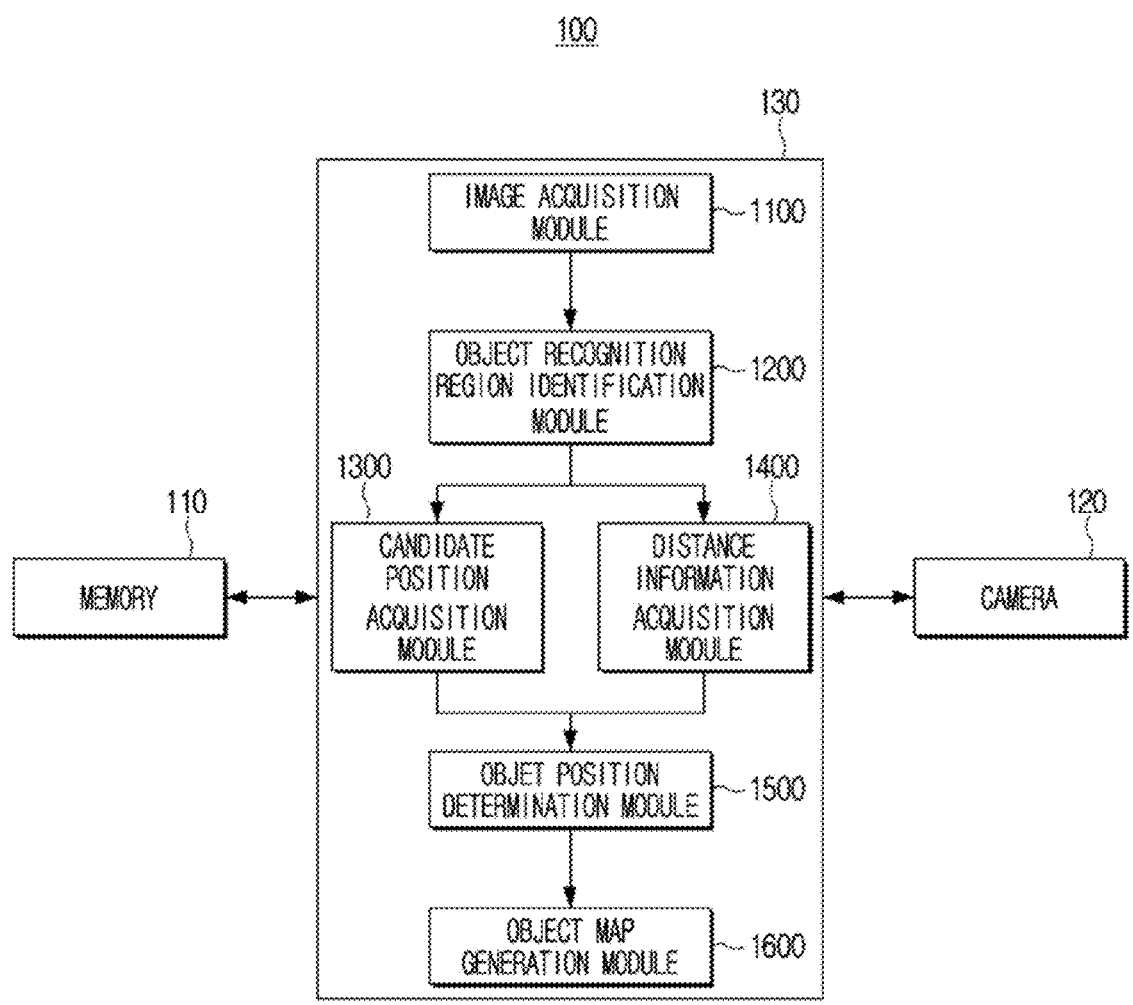
FIG. 1 is a block diagram of a robot according to an embodiment.

The present disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the present disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element).

On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of" The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

The various elements and regions in the drawings are schematically drawn. Accordingly, the technical spirit of the present disclosure is not limited by the relative size or spacing depicted in the accompanying drawings.

Embodiments of the disclosure will now be described in detail with reference to the attached drawings.

FIG. 1 is a block diagram of a robot according to an embodiment. A robot 100 may determine positions for a plurality of objects captured through a camera 120.

Referring to FIG. 1, the robot 100 may include a memory 110, the camera 120, and a processor 130. The robot 100 can be implemented as a robot cleaner, but can be implemented with various types of electronic devices that can autonomously travel.

The memory 110 may store various programs and data necessary for the operation of the robot 100. Specifically, at least one instruction may be stored in the memory 110. The processor 130 may perform the operation of the robot 100 by executing instructions stored in the memory 110.

The memory 110 may be a non-volatile memory, a volatile memory, a flash memory, a hard disk drive (HDD), or a solid state drive (SSD). The memory 110 may be accessed by the processor 130, and read/write/modify/update data by the processor 130 may be performed. In addition, the memory 110 may store programs and data for configuring various screens to be displayed on a display area of the display.

The camera 120 can capture an environment in which the robot 100 operates while the robot 100 is traveling. The robot 100 may obtain a plurality of images captured at different positions through the camera 120.

The processor 130 may be electrically connected to the memory 110 to control the overall operation and function of the robot 100. The processor 130 may control the overall operation of the robot 100. The processor 130 may include one or more of a central processing unit (CPU), an application processor (AP), or a communication processor (CP). The processor 130 may be implemented in a variety of ways. For example, the processor 130 may be implemented as at least one of an application specific integrated circuit (ASIC), an embedded processor, a microprocessor, hardware control logic, a hardware finite state machine (FSM), a digital signal processor (DSP), or the like. The term processor 130 in the disclosure can be used in a sense including a central processing unit (CPU), a graphic processing unit (GPU), and a main processing unit (MPU).

The processor 130 may control hardware or software components coupled to the processor 140 by driving an operating system or an application program, and may perform various data processing and operations. Further, the processor 130 may load and process commands or data received from at least one of the other components into the volatile memory and store the various data in the non-volatile memory.

In particular, the processor 130 may provide a position identification function for a plurality of objects captured through the camera 120. That is, through the position identification function, the robot 100 can determine a position for an object existing in the environment in which the robot 100 operates.

According to an embodiment, a position identification function may be implemented through a plurality of modules 1100 to 1600 included in the processor 130, as illustrated in FIG. 1. A plurality of modules for implementing the position identification function may be included in the robot 100, but this is only one embodiment, and at least some of the position identification functions may be included in an external server.

As described above, a plurality of modules 1100 to 1600 may be located in the processor 130. In other embodiments, a plurality of modules 1100 to 1600 may be located in the memory 110. When the plurality of modules 1100 to 1600 are located in the memory 110, the processor 130 may load the plurality of modules 1100 to 1600 into a volatile memory from a non-volatile memory to execute each of the functions of the plurality of modules 1100 to 1600. Loading refers to an operation in which data stored in a non-volatile memory can be retrieved and stored in a volatile memory so that the processor 130 can access.

An image acquisition module 1100 may be configured to, through the camera 120, acquire an image capturing an object in an environment where the robot 100 operates.

According to an embodiment, the robot 100 may obtain first and second images capturing a plurality of objects.

According to an embodiment, when an object is detected within an image of the camera 110, the image acquisition module 1100 may capture the detected object to obtain an image, but the embodiment is not limited thereto.

In an embodiment, the image acquisition module 1100 may capture an environment in which the robot 100 operates during a predetermined period of time (e.g., five seconds) while the robot 100 is traveling, and may obtain a plurality of images. The image acquisition module 1100 may identify whether an object is included in the obtained image, and identify an image including an object among the plurality of images.

Figure 2A:
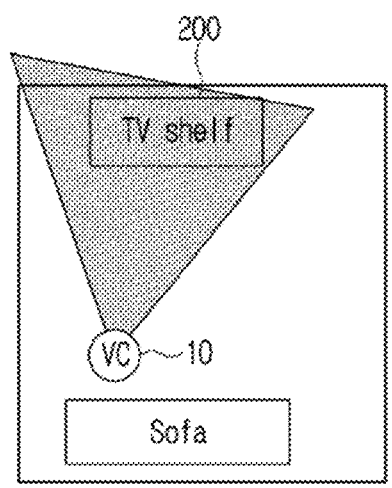
FIG. 2A is a diagram illustrating a robot capturing an object at a first position according to an embodiment.
Figure 2B:
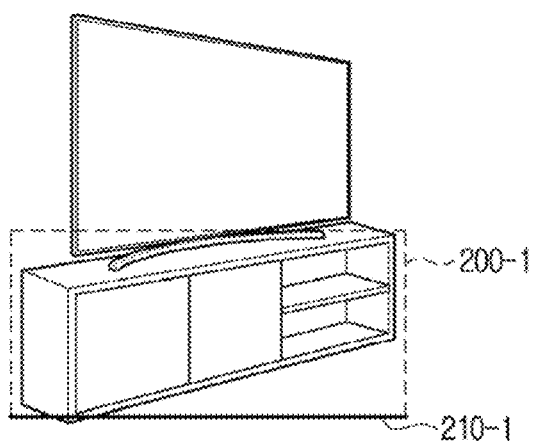
FIG. 2B is a diagram illustrating an image of the object captured by the robot of FIG. 2A at the first position according to an embodiment.
Figure 2C:
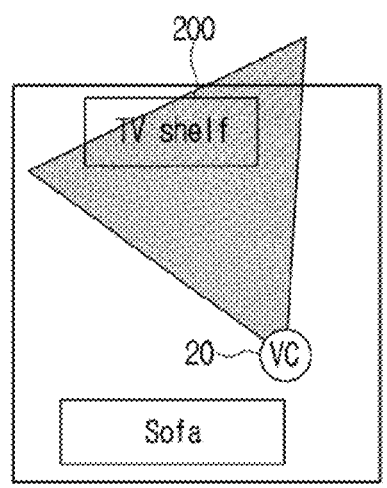
FIG. 2C is a diagram illustrating the robot capturing the object at a second position according to an embodiment.
Figure 2D:
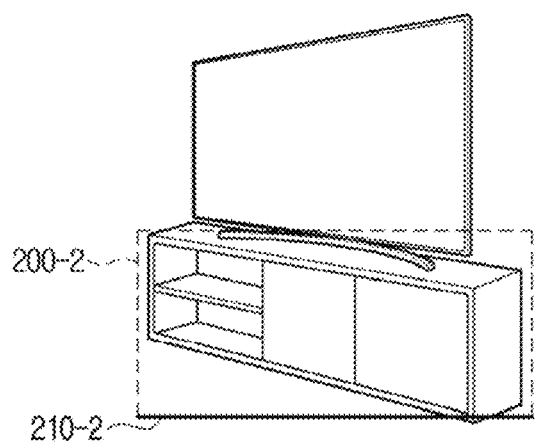
FIG. 2D is a diagram illustrating an image of the object captured by the robot of FIG. 2C at a second position according to an embodiment.

FIG. 2A is a diagram illustrating a robot photographing an object 200 at a first position 10, according to an embodiment. FIG. 2B is an image capturing the object 200 from the first position 10 taken by the robot 100. As shown in FIG. 2B, the image acquisition module 1100 may obtain, from the first position 10, a first image of a TV shelf in an environment in which the robot 100 operates FIG. 2C is a diagram illustrating a robot 100 capturing the object 200 at a second position 20, according to an embodiment. FIG. 2D is an image capturing the object 200 from the second position 20 taken by the robot 100. As shown in FIG. 2D, the image acquisition module 1100 may obtain, from the second position 20, a second image of a TV shelf in an environment in which the robot 100 operates.

An object recognition region identification module 1200 may be configured to identify a region in which an object is present in an image.

The object recognition region identification module 1200 may apply the image obtained from the image acquisition module 1100 to an artificial intelligence model to identify at least one object recognition region within the image. According to an embodiment, the artificial intelligence model may be an artificial intelligence model trained to identify an object region in an image.

According to an embodiment, the artificial intelligence model may be a first model trained to obtain a bounding box (B-Box) in an image through an object detection method. The first model may identify whether an object is present in a grid of a predetermined interval in an image, and may identify a region in which the object exists as a B-Box region. The object recognition region identification module 1200 may identify the B-Box region in the image identified through the first model as the object recognition region.

According to an embodiment, the artificial intelligence model may be a second model trained to obtain pixel regions in which an object is located in an image through a semantic segmentation method. The second model may classify all pixels in the image into a specific class, and classify the region where the object is located in units of pixels. The object recognition region identification module 1200 can identify pixels in the image obtained through the second model as an object recognition region.

According to an embodiment, the artificial intelligence model may be a third model trained to obtain a mask of a region in which an object exists in an image through an instance segmentation method. The third model may identify regions in which a plurality of objects exist in the image, and can obtain a mask corresponding to each object. That is, when the third model is used, each of the overlapping objects in the image can be identified. The object recognition region identification module 1200 can identify a region corresponding to the mask in the image obtained through the third model as an object recognition region.

Referring to FIGS. 2B and 2D, regions 200-1, 200-2 where a TV shelf is located in an image may be identified as an object recognition region.

According to an embodiment, the object recognition region identification module 1200 may not identify the region corresponding to the TV located on the TV shelf as the object recognition region. That is, the object recognition region identification module 1200 can identify only a region 200-1 corresponding to the object that is in contact with the floor, such as the TV shelf of FIG. 2B, as the object recognition region.

FIGS. 2B and 2D illustrate, but are not limited to, a region corresponding to a TV shelf that is in contact with a floor within an image being identified as an object recognition region. That is, the object recognition region identification module 1200 may identify a region corresponding to the TV shelf and the TV as one object recognition region.

A candidate position acquisition module 1300 may be configured to identify a position and direction to an object based on a position of an object recognition region in an image and obtain a candidate position of an object through the position and direction.

The candidate position acquisition module 1300 may identify a positon and direction to an object in an image based on a position of the object recognition region identified through the object recognition region identification module 1200.

Figure 3:
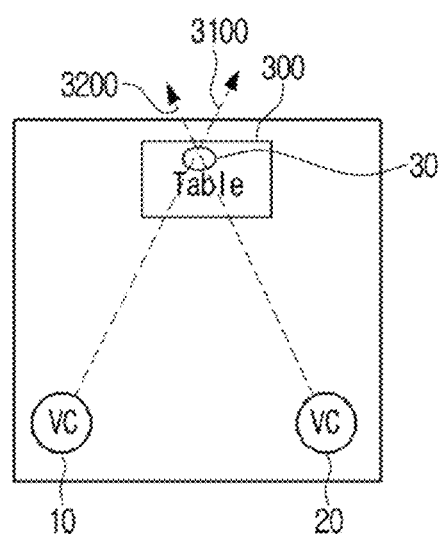
FIG. 3 is a diagram illustrating a method for identifying a candidate position with respect to one object according to an embodiment.

FIG. 3 is a diagram illustrating a method of identifying a candidate position for one object 300, according to an embodiment. FIG. 3 illustrates a first position 10 of the robot 100 capturing a first image, a second position 20 of the robot 100 capturing a second image, and an actual position of an object 300 on a map corresponding to the environment in which the robot 100 operates.

According to an embodiment, the map corresponding to the environment in which the robot 100 operates may be a map generated using a simultaneous localization algorithm and mapping (SLAM) method using a LiDAR sensor or a map generated using a vision SLAM using a camera.

Referring to FIG. 3, the candidate position acquisition module 1300 may identify a first direction 3100 through a first image capturing an object 300 taken by the robot 100 at the first position 10. The first direction 3100 is a direction in which the robot 100 views the object 300 in the first position 10, and can identify the direction to the object recognition region of the robot 100 in the first image in the first direction 3100.

According to an embodiment, the first direction 3100 may be a direction pointing to any point among the object recognition region of the robot 100 in the first image.

According to another embodiment, the first direction 3100 may be a direction pointing to a center point of the object recognition region of the robot 100 in the first image.

According to another embodiment, the first direction 3100 may be a direction pointing to an area center of the object recognition region of the robot 100 in the first image.

According to another embodiment, the first direction 3100 may be a direction pointing to a position determined based on a geometrical shape of the object recognition region of the robot 100 in the first image.

The candidate position obtaining module 1300 can identify a second direction 3200 through the second image in which the robot 100 captures the object 300 at the second position 20. The second direction 3200 may be a direction in which the robot 100 views the object 300 in the second position 20, and the direction to the object recognition region of the robot 100 in the second image can be used to identify the second direction 3200.

According to an embodiment, the second direction 3200 may be a direction pointing out any point among the object recognition region of the robot 100 in the second image.

According to an embodiment, the second direction 3200 may be a direction pointing out a center point of the object recognition region of the robot 100 in the second image.

According to an embodiment, the second direction 3200 may be a direction pointing out an area center of the object recognition region of the robot 100 in the second image.

According to an embodiment, the second direction 3100 may be a direction pointing out a position determined based on a geometrical shape of the object recognition region of the robot 100 in the second image.

The candidate position acquisition module 1300 can identify the position 30 at which the first direction 3100 at the first position 10 and the second direction 3200 at the second position 20 intersect as the candidate position of the object 300.

Figure 4:
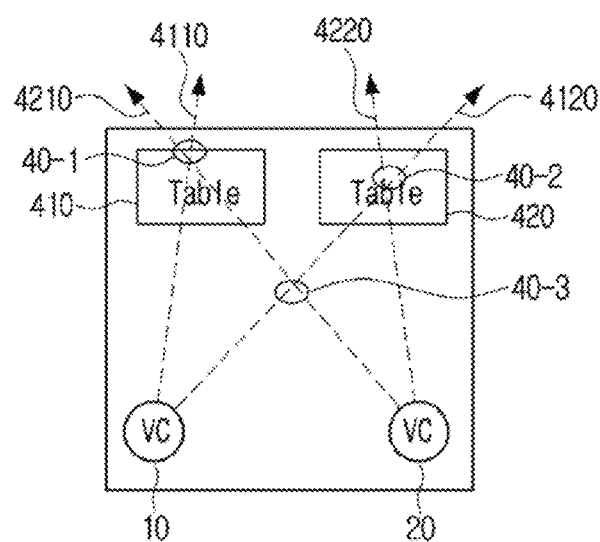
FIG. 4 is a diagram illustrating a method for identifying a candidate position with respect to two objects according to an embodiment.

FIG. 4 is a diagram showing a method for identifying a candidate position of two objects according to an embodiment.

FIG. 4 illustrates the first position 10 of the robot 100 capturing a first image, the second position 20 of the robot 100 capturing a second image, a first object 410, and a second object 420 on a map corresponding to an environment in which the robot 100 operates.

Referring to FIG. 4, the candidate position acquisition module 1300 may identify a first-first direction 4110 and a first-second direction 4120 through an image obtained by capturing the first object 410 and the second object 420 at the first position 10 of the robot 100. That is, the first-first direction 4110 is a direction in which the robot 100 views the first object 410 in the first position, and the first-second direction 4120 is a direction in which the robot 100 faces the second object 420 in the first position.

The candidate position acquisition module 1300 can identify a second-first direction 4210 and a second-second direction 4220 through an image obtained by capturing the first object 410 and the second object 420 in the second position 20 of the robot 100. The second-first direction 4210 is a direction in which the robot 100 faces the first object 410 in the second position, and the second-second direction 4220 is a direction in which the robot 100 faces the second object 420 in the second position.

The candidate position acquisition module 1300 can identify a plurality of positions 40-1, 40-2, 40-3 in which the first-first direction 4110 intersects with the second-first direction 4210, the second-first direction 4210 intersection with the first-second position 4120, and the second-second direction 4220 intersects with the first-second position 4120 as the candidate positions of the first object 410 and the second object 420.

The candidate position acquisition module 1300 can match a plurality of candidate positions on a map corresponding to an environment in which the robot 100 operates. The candidate position acquisition module 1300 can obtain a plurality of candidate positions by excluding candidate positions which are beyond a certain region on a map among a plurality of candidate positions.

That is, referring to FIG. 4, the candidate position acquisition module 1300 may identify a candidate position for the first object 410 and the second object 420 as the first position 40-1, the second position 40-2, and the third position 40-3. Accordingly, if only the capturing position of the image and the direction to the object in the image are used, an error, such as the third position 40-3, can be generated. Accordingly, an error can be excluded from a plurality of candidate positions through a distance information acquisition module 1400 and an object position determination module 1500.

The distance information acquisition module 1400 may be configured to obtain distance information between the robot 100 and the object in the image. The distance information acquisition module 1400 can obtain distance information between the robot 100 and the object in the image using the image captured through the camera 120 in which the calibration is performed.

The distance information acquisition module 1400 can obtain pixel information corresponding to a bottom portion of the object recognition region in the identified image through the object recognition region identification module 1200. The pixel information may refer to coordinate information in which pixels in an image is located.

Referring to FIG. 2B, the distance information acquisition module 1400 may obtain the first pixel information 210-1 corresponding to the bottom of the object recognition region 200-1 in the image. Referring to FIG. 2D, the distance information acquisition module 1400 may obtain second pixel information 210-2 corresponding to the bottom of the object recognition region 200-1 in the image.

The distance information acquisition module 1400 may obtain distance information between the robot 100 and the object in the image using the obtained pixel information. The distance information acquisition module 1400 can obtain the distance information between the object existing in the image and the robot 100 capturing the corresponding image by using the position of a line corresponding to the pixel information in the image. For example, the object in which the position of the line corresponding to the pixel information of the plurality of objects included in the image is relatively lower may be closer to the robot 100 than other objects.

The object position determination module 1500 is configured to determine the position of the plurality of objects using the plurality of candidate positions obtained by the candidate position acquisition module 1300 and the distance information obtained by the distance information acquisition module 1400.

Specifically, the positions of a plurality of objects can be obtained by excluding candidate positions of which the distance between the plurality of candidate positions and the positions capturing the plurality of images is different by a preset distance (e.g., 1 m) or more from the distance information obtained from the distance information acquisition module 1400, among the plurality of candidate positions obtained by the candidate position acquisition module 1300, or candidate positions which are different by a preset range (e.g., 80%) or more.

Figure 5:
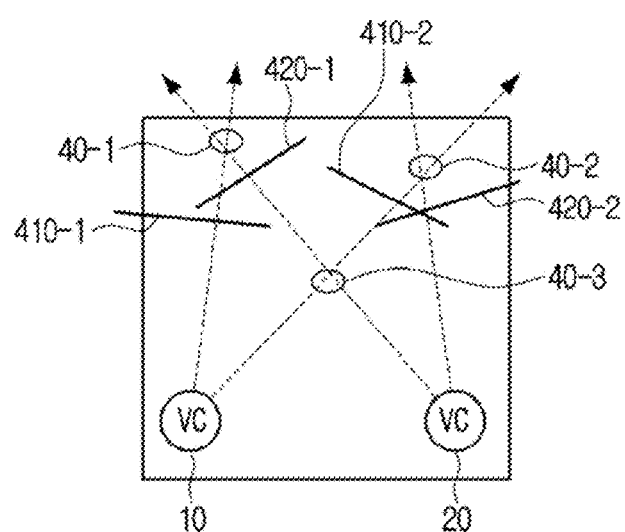
FIG. 5 is a diagram illustrating a method for determining positions of two objects from a plurality of candidate positions according to an embodiment.

FIG. 5 is a diagram illustrating a method for determining a position of two objects among a plurality of candidate positions according to an embodiment.

FIG. 5 is a view illustrating pixel regions 410-1, 410-2, 420-1, and 420-2 corresponding to the bottom portion of an object recognition region in an image on a map corresponding to the environment shown in FIG. 4 That is, a first-first pixel region 410-1 may refer to a region in which a pixel corresponding to a bottom portion of the object recognition region corresponding to the first object 410 in the first image captured at the first position 10. is positioned. A first-second pixel region 410-2 may refer to a region in which a pixel corresponding to a bottom portion of the object recognition region corresponding to the second object 420 in the first image captured at the first position 10. A second-first pixel region 420-1 may refer to a region in which the pixel corresponding to the bottom portion of the object recognition region corresponding to the first object 410 in the second image captured at the second position 20 is positioned. A second-second pixel region 420-2 may refer to a region in which the pixel corresponding to a bottom portion of the object recognition region corresponding to the second object 420 in the second image captured at the second position 20 is positioned.

Referring to FIG. 5, the object position determination module 1500 may obtain the position 40-1 of the first object 410 and the positon 40-2 of the second object 420 by excluding candidate positions, among the plurality of candidate positions 40-1, 40-2, 40-3 obtained by the distance information acquisition module 1400, of which the distance between the plurality of candidate positions 40-1, 40-2. 40-3 and the distance information obtained by the distance information acquisition module 1400 is different by a preset distance (e.g., 1 m) or candidate positions which are different by a preset range (e.g., 80%) or more.

Specifically, the distance between the third candidate position 40-3 and the first position 10, the distance between the first-second pixel region 410-2 and the first position 10, and the distance between the third candidate position 40-3 and the second position 20 may differ by a predetermined range ratio (e.g., 80%) or more. Accordingly, the object position determination module 1500 can identify a position other than the third candidate position 40-3 among the plurality of candidate positions 40-1, 40-2, 40-3 as the positions 40-1 and 40-2 corresponding to the first object 410 and the second object 420.

The object map generation module 1600 may be configured to provide the position of the identified object on a map corresponding to the environment in which the robot 100 operates.

If the position of the plurality of objects is determined through the object position determination module 1500, the object map generation module 1600 may display a plurality of objects on a map corresponding to the environment in which the robot 100 operates.

The map corresponding to the environment in which the robot 100 operates may be a map generated using the SLAM method or vision SLAM method using a camera.

The robot 100 can generate a map corresponding to the environment in which the robot 100 operates, but is not limited thereto. The robot 100 may receive a map corresponding to the environment in which the robot 100 operates from an external server and store the map on the memory 110.

The object map generation module 1600 may match a position of a plurality of objects on a map corresponding to the environment in which the robot 100 operates, and identify position information of a plurality of objects on the map.

According to an embodiment, the object map generation module 1600 can identify the size information of a plurality of objects by using pixel information at a bottom portion of the object recognition region obtained through the distance information acquisition module 1400. That is, the object map generation module 1600 may identify the size of the object to be larger, as the length of the bottom portion of the object recognition region is longer, using the length information of the bottom portion of the object recognition region obtained through the distance information acquisition module 1400.

The object map generation module 1600 can display a plurality of objects on a map using the identified size information and position information.

Figure 6:
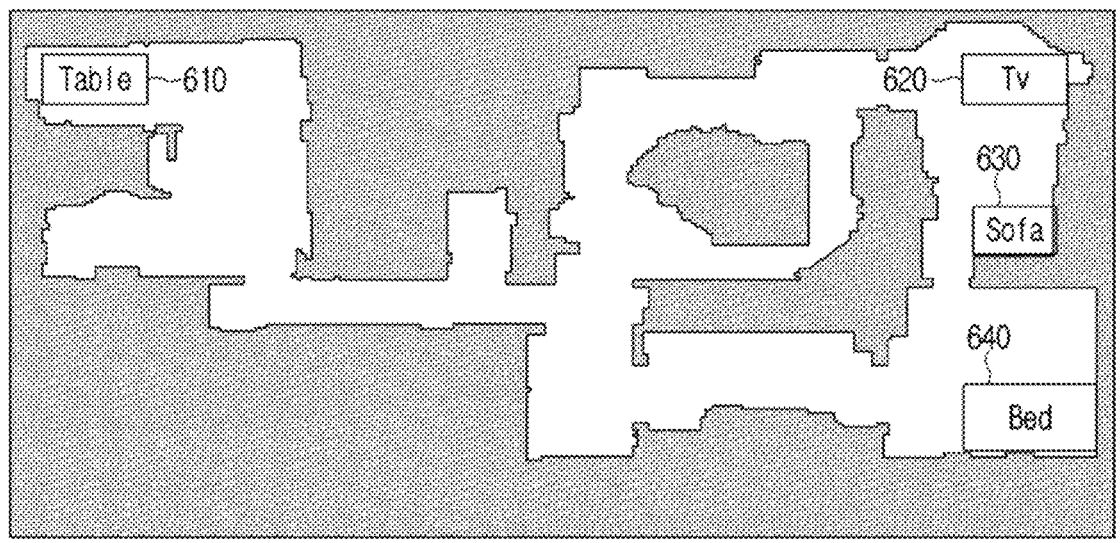
FIG. 6 is a diagram illustrating a position of an object on a map according to an embodiment.

FIG. 6 is a diagram showing a method for providing a position of an object on a map according to an embodiment. The object map generation module 1600 can display icons 610 to 640 corresponding to a plurality of objects on a map.

The icons 610 to 640 corresponding to a plurality of objects can include information on a plurality of objects. That is, the first icon 610 may include information that an object corresponding to the first icon 610 is a table, and the second icon 610 may include information that an object corresponding to the second icon is a TV.

According to an embodiment, information on a plurality of objects can be obtained through a plurality of images captured by the image acquisition module 1100. When an image capturing an object through the image acquisition module 1100 is obtained, the object map generation module 1600 can identify the type of the object. For example, the object map generation module 1600 can input an image to the artificial intelligence model trained to identify the object to identify the type of the object included in the image. For example, when the image of FIG. 2B is input to the artificial intelligence model trained to identify the object, the object map generation module 1600 can identify a type of the object included in the corresponding image as the TV and the TV shelf.

If the type of object is identified through the artificial intelligence model trained to identify the object, a user interface (UI) asking whether the identified type of an object is correct may be provided. If the type of the object identified by the first UI is determined to be correct, the object map generation module 1600 can display information on the type of the identified object on the icon of the identified object. If the type of the object identified by the first UI is identified to be different, the object map generation module 1600 can provide a second UI to obtain the type of the object.

According to an embodiment, the robot 100 can obtain information on a plurality of objects by a user. The object map generation module 1600 can provide a second UI to obtain a type of an object corresponding to an icon displayed on a map. The object map generation module 1600 may obtain a type of an object corresponding to an icon displayed on a map from a user through a second UI, and display information corresponding to the object on the icon.

As described above, a method of determining the position of a plurality of objects is described by using the first and second images captured at the first position 10 and the second position 20, but the disclosure is not limited thereto.

According to an embodiment, the image acquisition module 1100 can obtain a third image capturing a plurality of objects from a different position than the first image and the second image.

The object position determination module 1500 can determine a position of a plurality of objects based on the first image and the third image. That is, the candidate position acquisition module 1300 may obtain a candidate position based on the first image and the third image. The distance information acquisition module 1400 may obtain distance information between the robot 100 and the plurality of objects based on the first image and the third image. The object position determination module 1500 can determine a position of a plurality of objects based on the first image and the third image.

The object position determination module 1500 may determine a position of a plurality of objects based on the second image and the third image.

The object position determination module 1500 can determine the final position of the plurality of objects by considering the positions of the plurality of objects determined based on the first image and the second image, and the position of the plurality of objects determined based on the first image and the third image, and/or the positions of the objects determined based on the second image and the third image. For example, the object position determination module 1500 can identify coordinates in a reset setting range (e.g., 2 m) among coordinates corresponding to a position of a plurality of objects obtained based on two different combinations among the first image, the second image, and the third image as coordinates corresponding to any one of the plurality of objects. The object position determination module 1500 can identify an average value of the coordinates in the preset range (e.g., 2 m) as the final position of the any one object.

According to an embodiment, the image acquisition module 100 may obtain a first image and a second image, and may further obtain at least one additional image capturing the plurality of objects.

The object position determination module 1500 can determine a position of a plurality of objects based on a combination of two images different from the first image, the second image, and the at least one additional image.

The object positon determination module 1500 may determine a final position of a plurality of objects by statistically analyzing the positions that are determined by each combination.

As described above, according to various embodiments, a robot may identify a position of an object in an environment and provide a map including a positon of an object in an environment.

Figure 7:
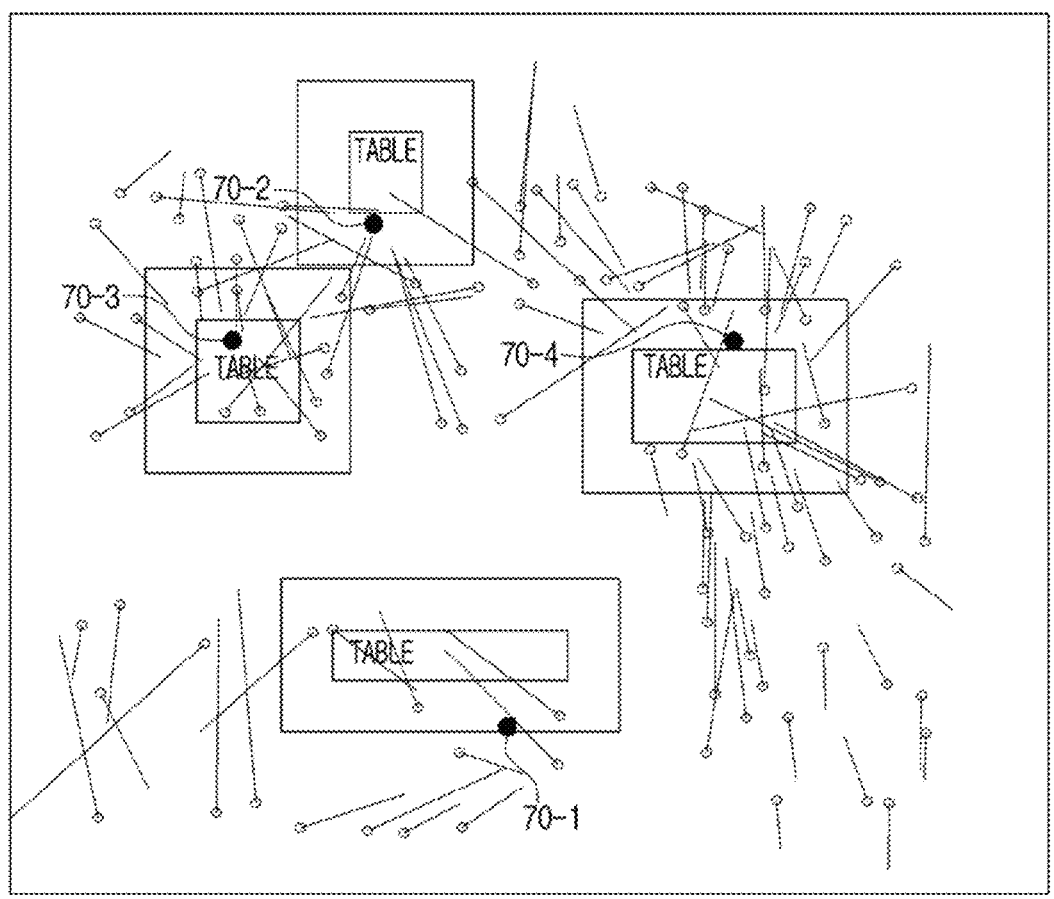
FIG. 7 is a diagram illustrating a method for identifying a final position of a plurality of objects through a statistical classification method according to an embodiment.

FIG. 7 is a diagram illustrating a method for identifying a final position of a plurality of objects through a statistical classification method according to an embodiment.

While the robot 100 is driving within the environment in which the robot 100 is operating, the robot 100 can obtain a plurality of images capturing any one object, among a plurality of objects, from different positions. The object position determination module 1500 may identify a final position of the objects by displaying positions at which the robot captured a plurality of images on a map corresponding to the environment in which the robot operates and displaying a direction to the plurality of objects from the corresponding positions by using an object recognition region in a plurality of images. Referring to FIG. 7, a plurality of unfilled circles displayed on a map represent a position at which a plurality of images are captured, and a line corresponding to the unfilled circle indicates a direction to a plurality of objects from the corresponding position. The length of the line represents the distance between the robot 100 and the object in the image obtained by using pixel information corresponding to the bottom of the object recognition region included in the image captured at the corresponding position.

The object position determination module 1500 can statistically classify unfilled circles and lines corresponding to a plurality of unfilled circles displayed on a map as shown in FIG. 7 to determine the final positions of the plurality of objects 70-1 to 70-4. For example, the object position determination module 1500 may statistically classify positions of a plurality of objects obtained by using two different images of the plurality of images to determine the final positions 70-1 to 70-4 of the plurality of objects using K-means clustering technique. The K-means clustering technique is a divisive clustering algorithm in which each cluster has one center, and the center of each cluster can be identified as an average value of the distance in the cluster. For example, the object position determination module 1500 can identify a K value corresponding to the number of clusters through a Silhouette method. The silhouette method is a method of identifying a value of K of which dissimilarity is minimized between any one of a plurality of data belonging to a cluster and data in a cluster in which the data belongs. The identified number of K can be the number of the plurality of objects. In other words, referring to FIG. 7, the object position determination module 1500 may classify the positions of the plurality of objects obtained by using two images of the plurality of images into K (four in FIG. 7) and identify the central point of each cluster as the final positions (70-1 to 70-4) of the plurality of objects.

Figure 8:
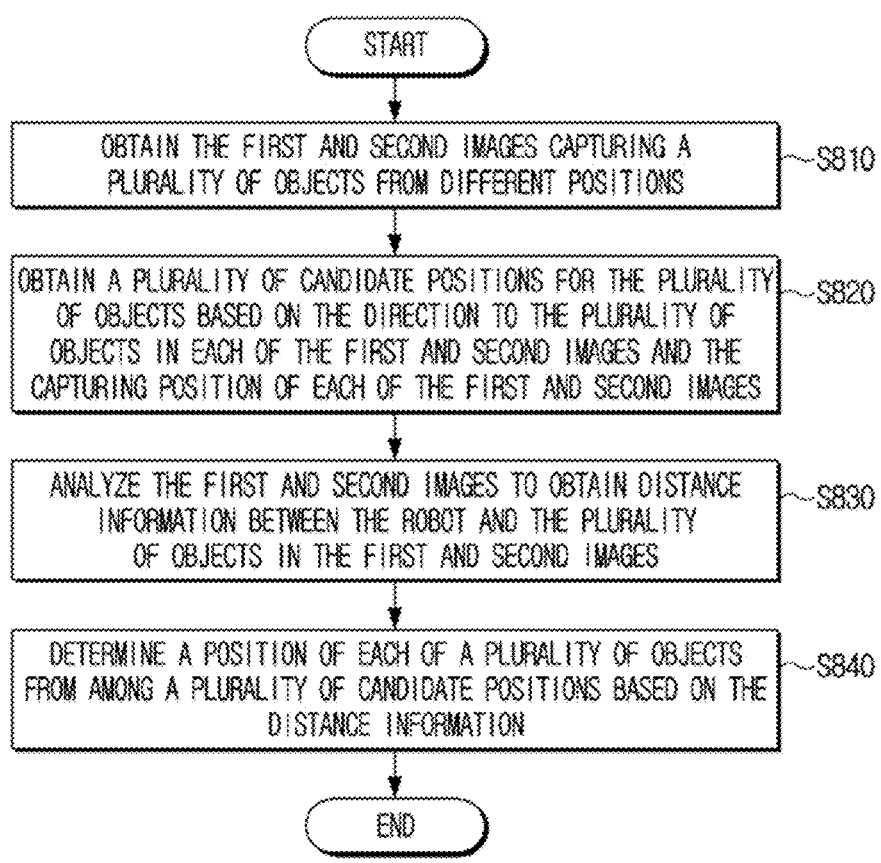
FIG. 8 is a flowchart of a method for controlling a robot according to an embodiment.

FIG. 8 is a flowchart of a method for controlling a robot according to an embodiment.

In operation S810, the robot 100 may obtain the first and second images capturing a plurality of objects from different positions.

In operation S820, the robot 100 can obtain a plurality of candidate positions for the plurality of objects based on the direction to the plurality of objects in each of the first and second images and the capturing position of each of the first and second images.

For example, the robot 100 may apply first and second images to an artificial intelligence model to identify a plurality of object recognition regions in the first and second images. The artificial intelligence model may be an artificial intelligence model trained to identify an object area in an image.

The robot 100 can identify a direction to a plurality of objects based on the position of the object recognition region in the first image and the second image. The robot 100 can identify the coordinates corresponding to the positions at which a direction to each object at the capturing position of the first image and a direction to each object at the capturing position of the second image intersect on a map corresponding to an environment in which the robot 100 operates.

When a plurality of candidate positions are identified, the robot 100 can analyze the first and second images to obtain distance information between the robot 100 and the plurality of objects in the first and second images in operation S830.

For example, the robot 100 can obtain pixel information corresponding to the bottom of the object recognition region in the first and second images. The robot 100 can obtain distance information between the robot 100 and the plurality of objects in the first and second images using the obtained pixel information.

In operation S840, the robot 100 can determine a position of each of a plurality of objects from among a plurality of candidate positions based on the distance information.

For example, the robot 100 can determine a position of the plurality of objects by excluding a candidate position in which a distance between a plurality of candidate positions among the plurality of candidate positions and coordinates corresponding to a plurality of candidate positions is different by a preset range or more than the distance information obtained in the step S830. For example, the robot 100 can determine a position of a plurality of objects by excluding candidate positions where a distance between a plurality of candidate positions among a plurality of candidate positions and coordinates corresponding to a plurality of candidate positions is different than the distance information by a preset distance (e.g., 1 m) or more or different by a preset range ratio (e.g., 80%).

Figure 9:
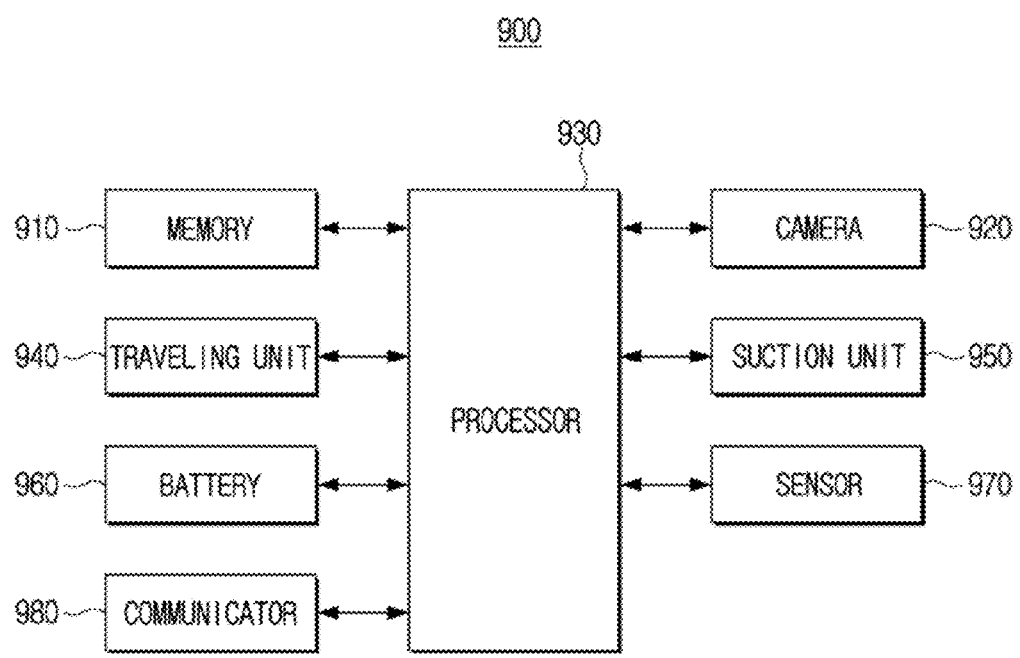
FIG. 9 is a block diagram of a robot according to an embodiment.

FIG. 9 is a block diagram of a robot according to an embodiment. In the embodiment of FIG. 9, the robot 900 may be a robot cleaner.

Referring to FIG. 9, a robot 900 may include a memory 910, a camera 920, a processor 930, a traveling unit 940, a suction unit 950, a battery 960, a sensor 970, and a communicator 980. However, the configuration is merely explanatory, some configurations can be added in addition the shown configuration, or some configurations may be omitted. The memory 910, the camera 920, and the processor 930 have been described with reference to FIG. 1, and the remaining configurations are described below.

The traveling unit 940 may be configured to move the robot 900 by the control of the processor 930, and can include a motor and a plurality of wheels. Specifically, the traveling unit 940 can change the direction of moving and moving speed of the robot 900 by the control of the processor 930.

The suction unit 950 may suck dust on the bottom surface of the robot. For example, the suction unit 950 can suck in dust from a ground surface while moving or stopping, to perform cleaning. The suction unit 950 may further include an air purification unit for purifying pollutants in the air.

The battery 960 may be configured to supply power to the robot 900, and the battery 960 can be charged by a charging station. According to an embodiment, the battery 960 may include a receiving resonator for wireless charging. According to an embodiment, the charging method of the battery 960 may be a constant current constant voltage (CCCV) charging method which rapidly charges a predetermined capacity through a constant current (CC) charging method and charges the remaining capacity through a constant voltage (CV) method, but the disclosure is not limited thereto and the battery can be charged in various manners.

The sensor 970 may include various sensors required for the operation of the robot 900. For example, the sensor 970 may include a distance sensor, a LiDAR sensor, a geomagnetic sensor, or the like.

The distance sensor may be configured to obtain distance information corresponding to the charging station of the robot 900 and can be implemented with an infrared ray sensor, an ultrasonic sensor, a radio frequency (RF) sensor, or the like, and may be provided on an inner or external side of the robot 900.

The LiDAR sensor may be a sensor capable of obtaining information about physical characteristics related to a target object (the position and direction of the robot 900, the distance between the robot 900 and the target object, the shape and movement speed of the target object, etc.) associated with the target object using time taken until emitted and scattered laser pulse or laser pulse reflected from the target device return, a change in the intensity, frequency, and polarization state of the laser scattered or reflected.

Specifically, the robot 900 can scan the surroundings of the robot 900 by using the LiDAR sensor to obtain a LiDAR map. The LiDAR map is a map that can be obtained using information on a physical characteristic of the robot 900 obtained by using a laser pulse of the LiDAR sensor. The robot 900 may perform SLAM using the LiDAR sensor and obtain information on the position of the robot 900 in the LiDAR map.

The geomagnetic sensor may be a sensor for detecting a value for geomagnetic and can obtain information about the geomagnetic direction around the geomagnetic sensor and information on the geomagnetic size.

The communicator 980 can communicate with an external device and an external server through various communication schemes. Communication of the communicator 980 with an external device and an external server may include communication through a third device (e.g., a relay, a hub, an access point, a gateway, etc.).

The communicator 980 may include various communication modules to perform communication with an external device. For example, the communicator 980 may include a wireless communication module, for example, may include cellular communication using any one of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, any one or any combination of wireless fidelity (Wi-Fi), Bluetooth, Bluetooth low energy (BLE), Zigbee.

According to an embodiment, the processor 930 may receive a LiDAR map or a geometric map, or the like, corresponding to the environment in which the robot 900 operates from an external device or an external server through the communicator 980, and can store the map on the memory 910.

According to an embodiment, the processor 930 may provide a UI for identifying the type of an object to a user terminal device through the communicator 980. The processor 930 can receive information on a plurality of objects from the user terminal device through the communicator 980.

The various embodiments described above may be implemented in software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor. According to a software implementation, embodiments, such as the procedures and functions described herein, may be implemented with separate software modules. Each of the above-described software modules may perform one or more of the functions and operations described herein.

A method according to various embodiments described above may be stored in a non-transitory readable medium. Such a non-transitory computer-readable medium may be loaded and used in a variety of devices.

A non-transitory computer-readable medium refers to a medium that stores data semi-permanently, rather than a medium that stores data for a short moment, such as a register, cache, memory, etc., and refers to a medium readable by a device. Specifically, the programs for performing the various methods described above may be stored and provided in a non-transitory readable medium, such as a compact disc (CD), a digital video disc (DVD), a hard disk, a Blu-ray disc, a universal serial bus (USB), a memory card, a read-only memory (ROM), etc.

According to some embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PlayStore™, AppStore™). In the case of on-line distribution, at least a portion of the computer program product may be stored temporarily or at least temporarily in a storage medium, such as a manufacturer's server, a server in an application store, a memory in a relay server, and the like.

While the disclosure has been shown and described with reference to various example embodiments thereof, it will be understood by those skilled in the art that various changes in form and details may be made therein without departing from the spirit and scope of the disclosure as defined by the appended claims and their equivalents.

What is claimed is:

1. A method of controlling a robot, comprising:
obtaining a first image and a second image of a plurality of objects, the first image and the second image being captured from different positions;
obtaining, from the first and second images, a plurality of candidate positions corresponding to each of the plurality of objects, based on a capturing position of each of the first and second images and a direction to each of the plurality of objects from each capturing position;
obtaining distance information between each capturing position and each of the plurality of objects in the first and second images by analyzing the first and second images;
identifying a position of each of the plurality of objects from among the plurality of candidate positions based on the distance information, and
controlling the robot based on the position of each of the plurality of objects,
wherein the identifying the position of each of the plurality of objects comprises classifying the plurality of candidate positions into a plurality of clusters and identifying a central point of each of the plurality of clusters as the position of each of the plurality of objects.

2. The method of claim 1, further comprising:
obtaining a third image which captures the plurality of objects at a position different from the capturing positions of the first image and the second image;
determining the position of each of the plurality of objects based on the first image and the third image;
determining the position of each of the plurality of objects based on the second image and the third image; and
determining a final position of each of the plurality of objects based on all the determined positions.

3. The method of claim 1, further comprising:
obtaining at least one additional image of the plurality of objects;
determining the position of each of the plurality of objects based on a plurality of combinations of two images from among the first image, the second image, and the at least one additional image; and
determining a final position of the plurality of objects by statistically clustering the positions determined by each combination.

4. The method of claim 1, wherein the obtaining the plurality of candidate positions corresponding to each of the plurality of objects comprises:
identifying a plurality of object recognition regions in each of the first and second images by applying the first and second images to an artificial intelligence model;
based on a position of the object recognition regions in each of the first and second images, identifying the direction to each of the plurality of objects; and
identifying, on a map corresponding to an environment in which the robot operates, a coordinate in which a direction to an object from the capturing position of the first image and a direction to the object from the capturing position of the second image intersect as a candidate position from among the plurality of candidate positions.

5. The method of claim 4, wherein the obtaining the distance information comprises:
obtaining pixel information corresponding to a bottom portion of the object recognition regions in each of the first and second images; and
obtaining, based on the obtained pixel information, distance information between the capturing positions of, and the plurality of objects in, the first and second images.

6. The method of claim 5, further comprising:
identifying information about a position of each of the plurality of objects on the map by matching the position of the plurality of objects with corresponding locations on the map;
identifying size information of the plurality of objects using the pixel information; and
displaying the plurality of objects using positon information and size information of the plurality of identified object recognition regions.

7. The method of claim 6, further comprising:
providing information about the plurality of objects on the map,
wherein the information about the plurality of objects is obtained through the first and second images.

8. The method of claim 1, wherein the identifying the position of each of the plurality of objects comprises excluding a candidate position of an object, from among the plurality of candidate positions of the object, of which a distance between the candidate position and a coordinate corresponding to a capturing position of the candidate position is greater than or equal to a preset range from distance information between the position of the object and the capturing position of the candidate position.

9. The method of claim 1, wherein the obtaining the plurality of candidate positions comprises:
obtaining a map corresponding to an environment in which the robot operates;
matching the plurality of candidate positions with corresponding locations on the map; and
obtaining the plurality of candidate positions by excluding a candidate position, from among the plurality of candidate positions, which is beyond a preset range from a capture location on the map.

10. A robot comprising:
a memory configured to store at least one instruction;
a camera configured to capture an image of a plurality of objects; and
a processor connected to the memory and the camera, the processor being configured to control the robot,
wherein the processor, by executing the at least one instruction, is further configured to:
obtain a first image and a second image of the plurality of objects, the first image and the second image being captured from different positions, obtain, from the first and second images, a plurality of candidate positions corresponding to each of the plurality of objects, based on a capturing position of each of the first and second images and a direction to each of the plurality of objects from each capturing position, obtain distance information between each capturing position and each of the plurality of objects in the first and second images by analyzing the first and second images, identify a position of each of the plurality of objects from among the plurality of candidate positions based on the distance information, and control the robot according to the position of each of the plurality of objects, and wherein the processor is further configured to identify the position of each of the plurality of objects by classifying the plurality of candidate positions into a plurality of clusters and identifying a central point of each of the plurality of clusters as the position of each of the plurality of objects.

11. The robot of claim 10, wherein the processor is further configured to:

obtain a third image which captures the plurality of objects at a position different from the capturing positions of the first image and the second image;

determine the position of each of the plurality of objects based on the first image and the third image;

determine the position of each of the plurality of objects based on the second image and the third image; and determine a final position of each of the plurality of objects based on all the determined positions.

12. The robot of claim 10, wherein the processor is further configured to:

obtain at least one additional image of the plurality of objects, through the camera, determine the position of each of the plurality of objects based on a plurality of combinations of two images from among the first image, the second image, and the at least one additional image; and determine a final position of the plurality of objects by statistically clustering the positions determined by each combination.

13. The robot of claim 10, wherein the processor is further configured to:

identify a plurality of object recognition regions in each of the first and second images by applying the first and second images to an artificial intelligence model, based on a position of the object recognition regions in each of the first and second images, identify the direction to each of the plurality of objects, and on a map corresponding to an environment in which the robot operates, identify a coordinate in which a direction to an object from the a capturing position of the first image and a direction to the object from the a capturing position of the second image intersect as a candidate position from among the plurality of candidate positions.

14. The robot of claim 13, wherein the processor is further configured to:

obtain pixel information corresponding to a bottom portion of the object recognition regions in each of the first and second images, and obtain, based on the obtained pixel information, distance information between the capturing positions of, and the plurality of objects in, the first and second images.

15. The robot of claim 14, wherein the processor is further configured to:

identify information about a position of each of the plurality of objects on the map by matching the position of the plurality of objects with corresponding locations on the map, identify size information of the plurality of objects using the pixel information, and display the plurality of objects using positon information and size information of the plurality of identified object recognition regions.

16. The robot of claim 15, wherein the processor is further configured to provide information about the plurality of objects on the map, and wherein the information about the plurality of objects is obtained through the first and second images.

17. The robot of claim 10, wherein the processor is further configured to:

obtain a position an object by excluding a candidate position of the object, from among the plurality of candidate positions of the object, of which a distance between the candidate position and a coordinate corresponding to a capturing position of the candidate position is greater than or equal to a preset range from distance information between the position of the object and the capturing position of the candidate position.

18. The robot of claim 10, wherein the processor is further configured to:

obtain a map corresponding to an environment in which the robot operates, match the plurality of candidate positions with corresponding locations on the map, and obtain the plurality of candidate positions by excluding a candidate position, from among the plurality of candidate positions, which is beyond a preset range from a capture location on the map.

* * * * *